April 5, 1949.　　　F. L. LAWRENCE　　　2,466,319
PLANETARY TRANSMISSION UNIT
Filed Nov. 30, 1944　　　　　　　　　9 Sheets-Sheet 1
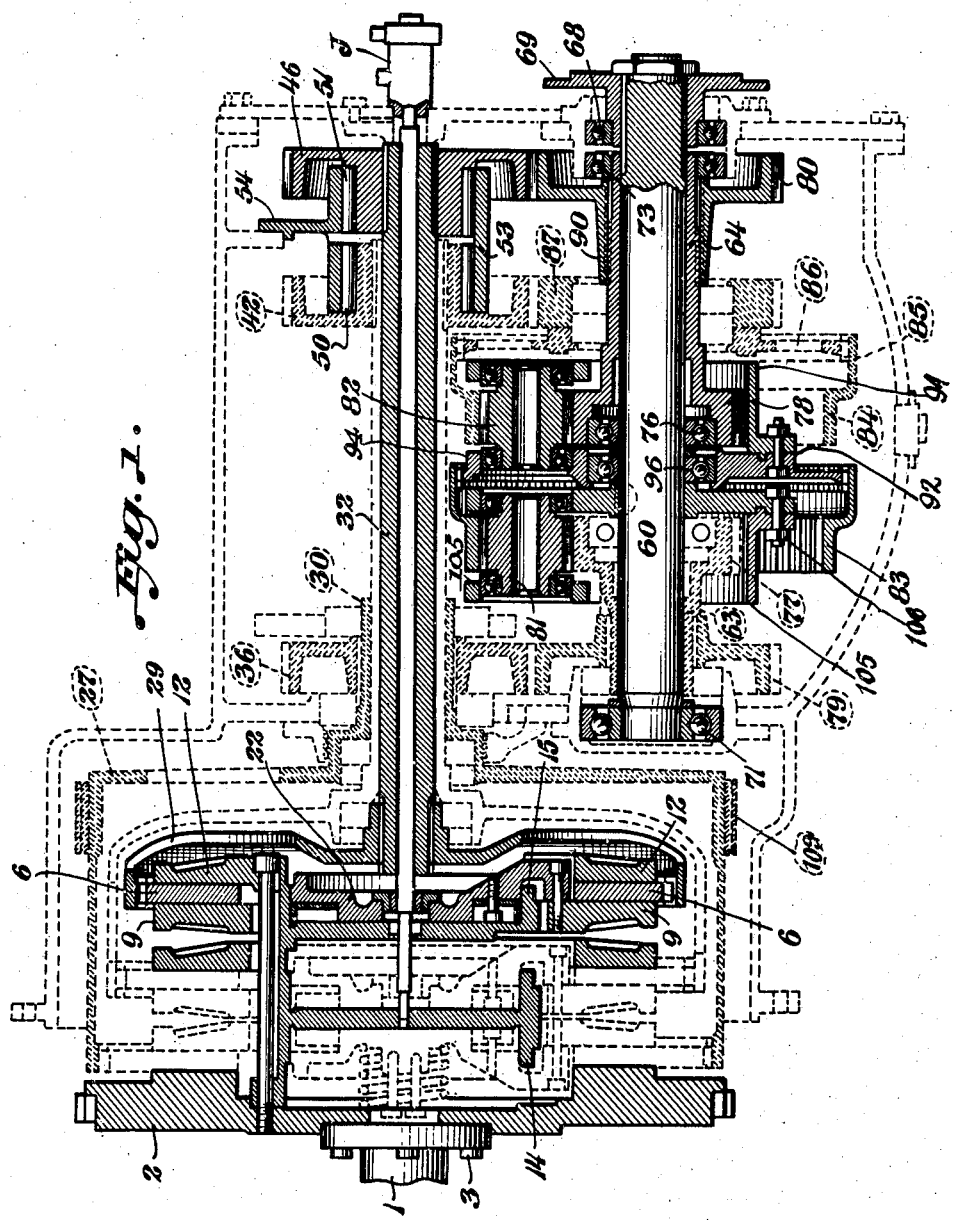
Inventor
Frank L. Lawrence
By Ralph T. Barrett
Attorney

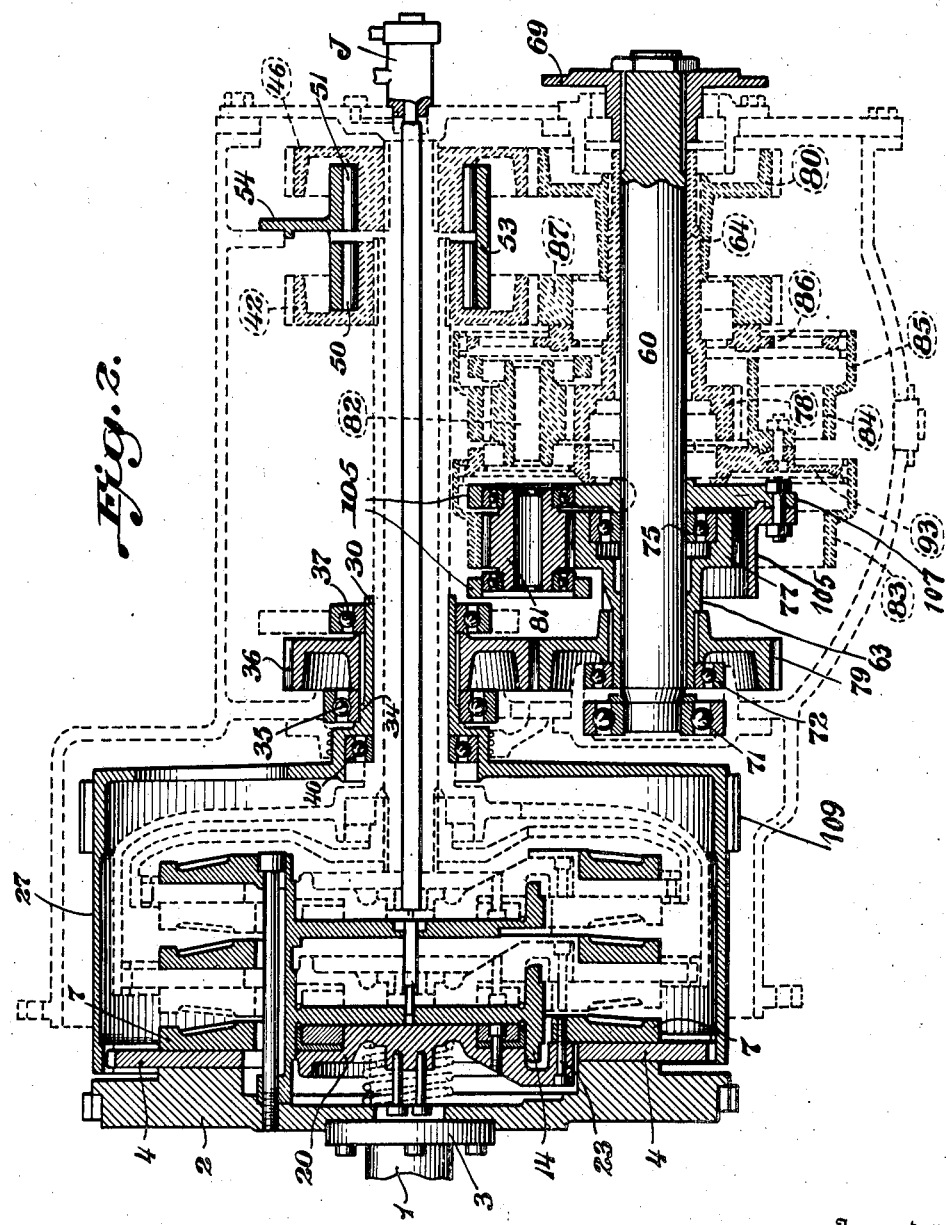

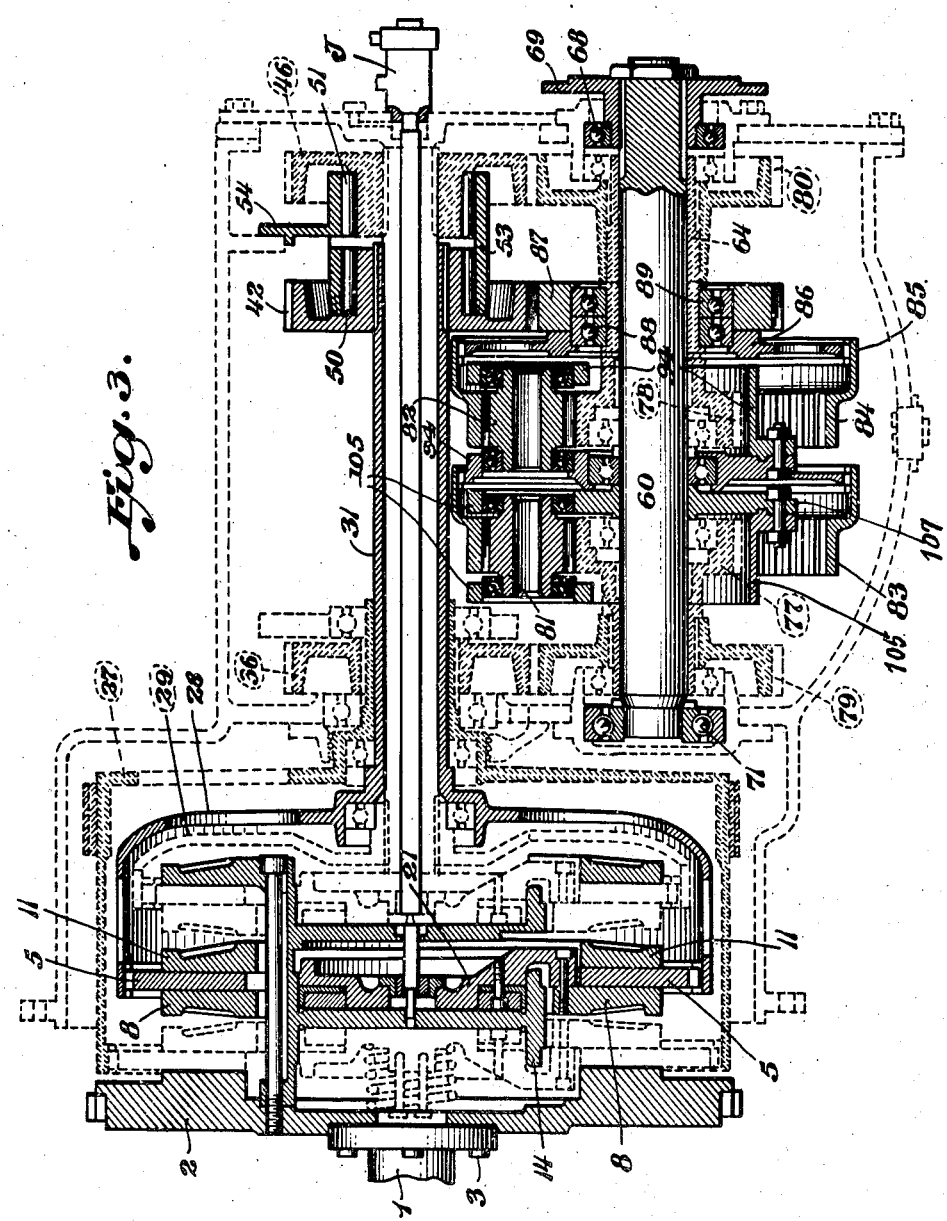

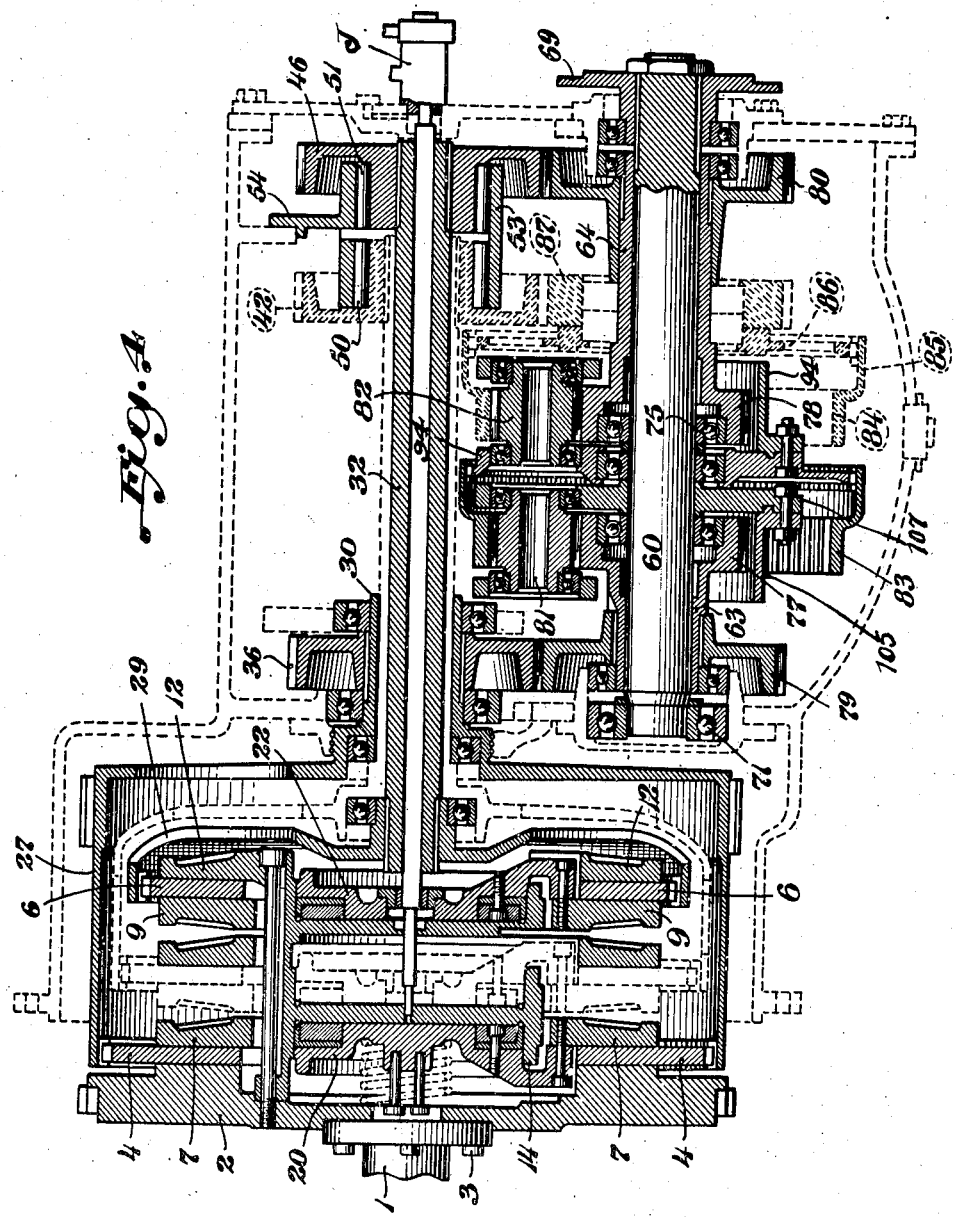

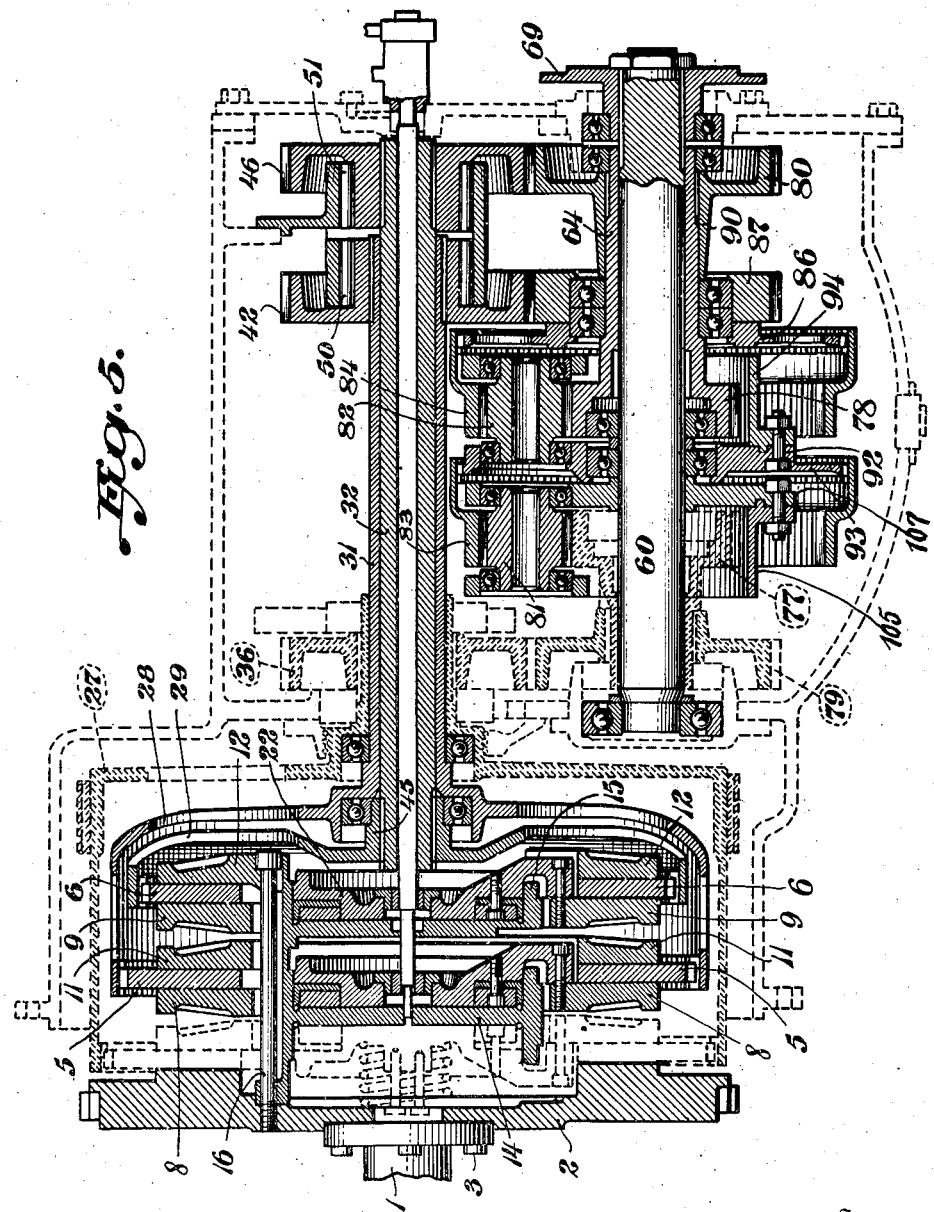

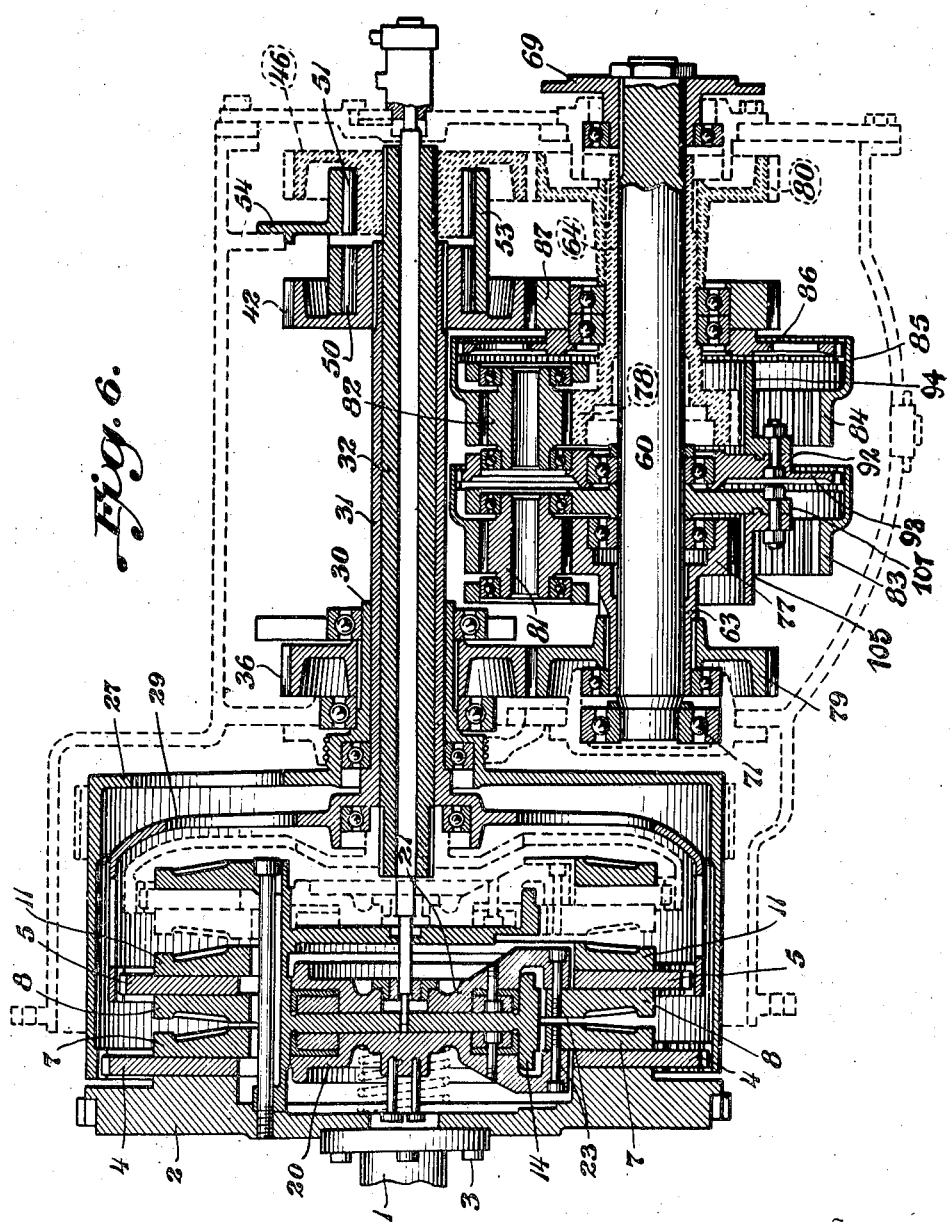

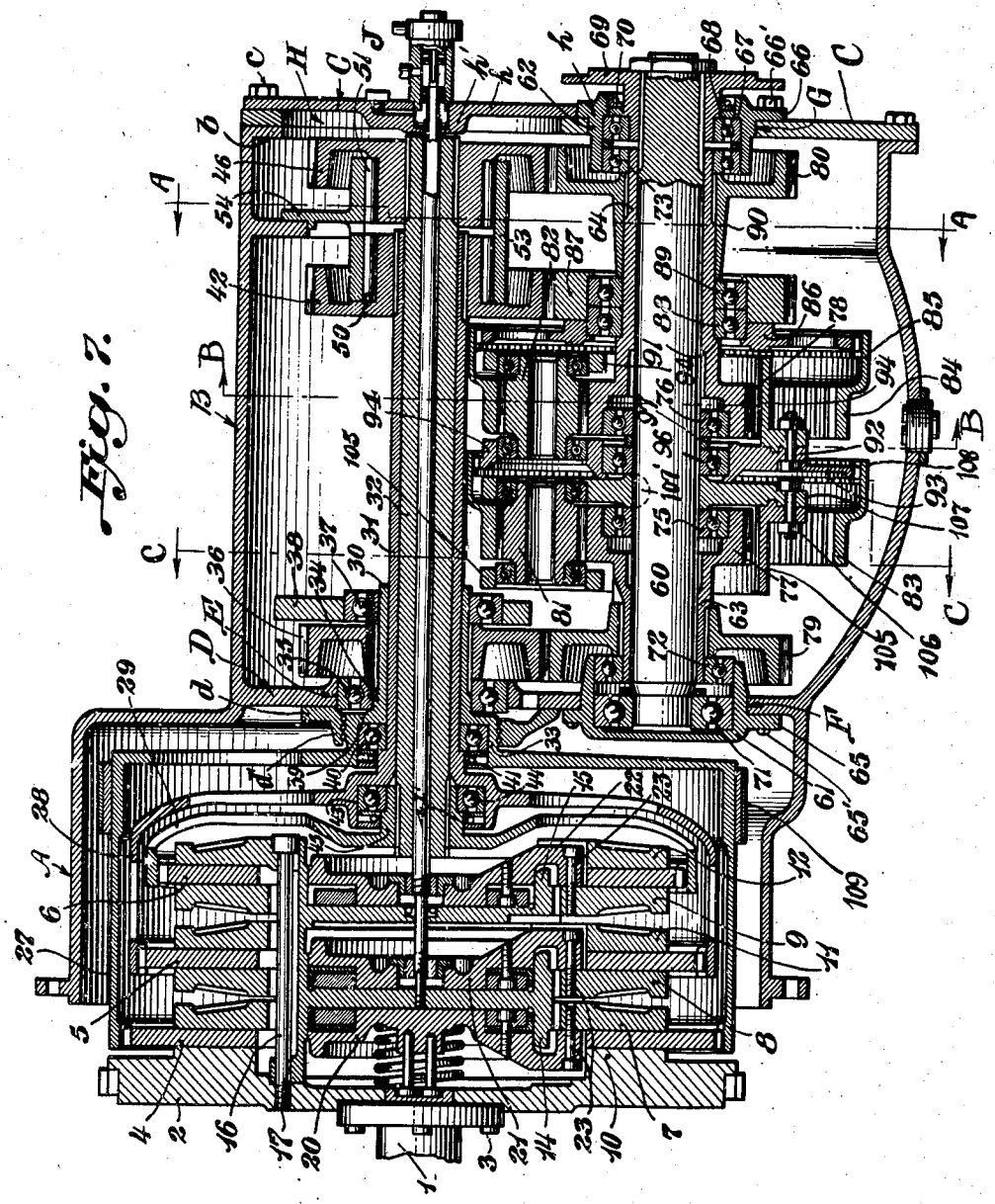

April 5, 1949.  F. L. LAWRENCE  2,466,319
PLANETARY TRANSMISSION UNIT
Filed Nov. 30, 1944  9 Sheets-Sheet 8
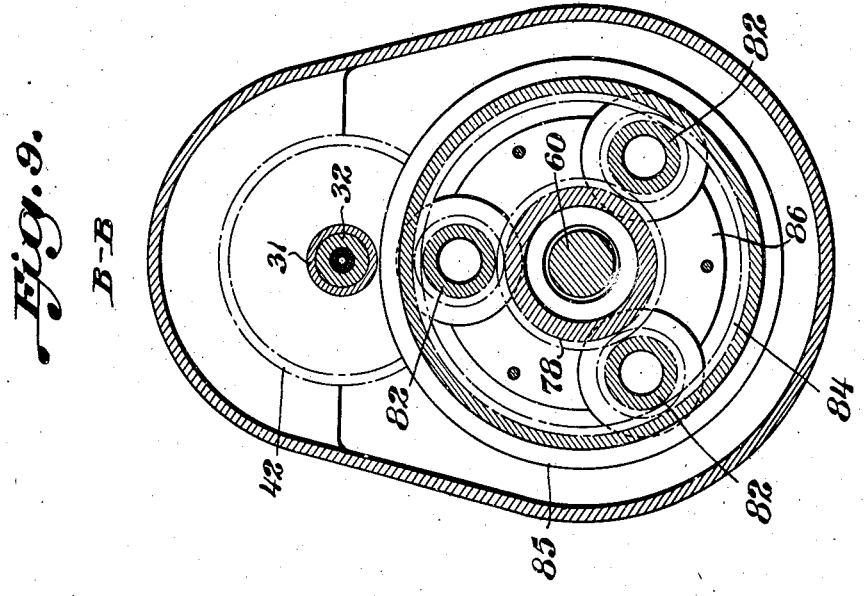
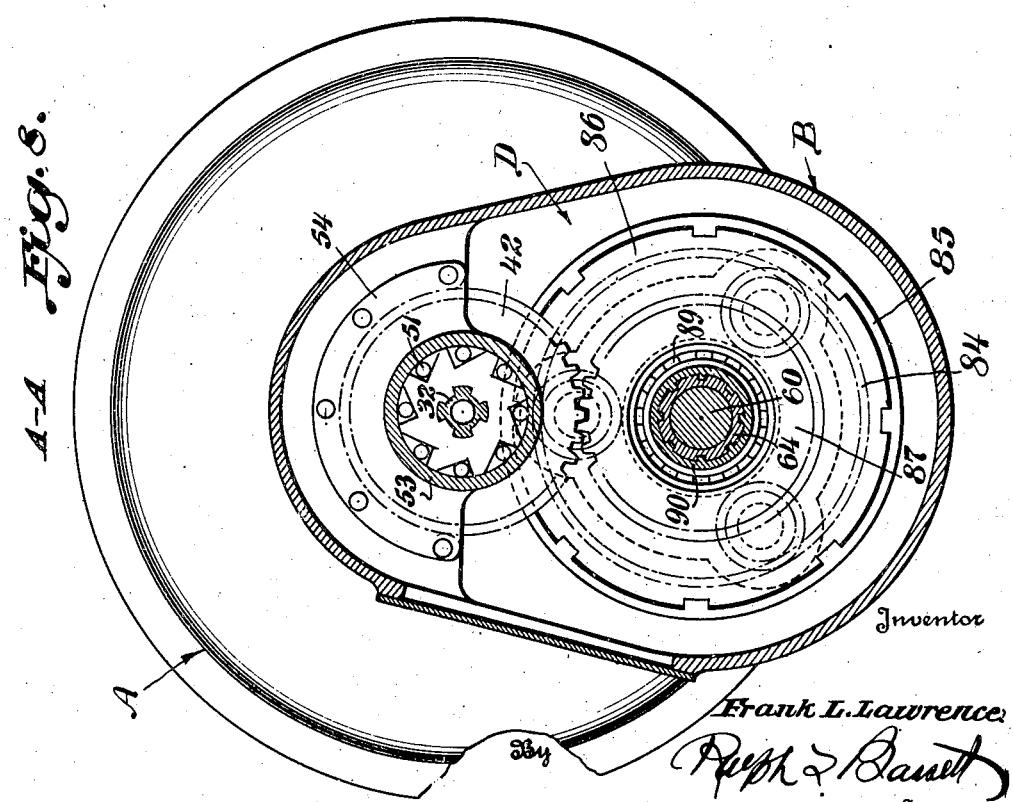
Inventor
Frank L. Lawrence
By Ralph L. Bassett
Attorney

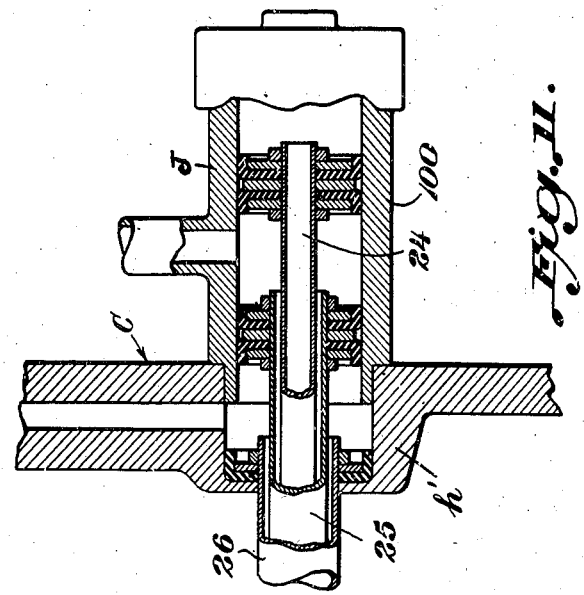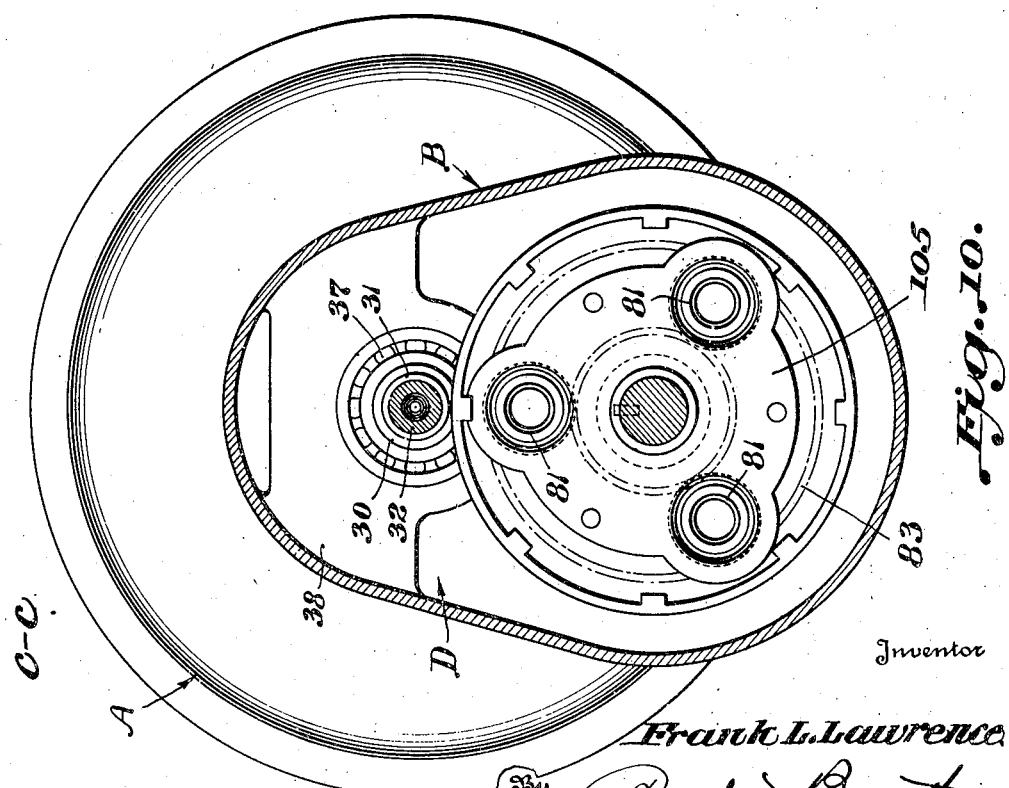

Patented Apr. 5, 1949

2,466,319

UNITED STATES PATENT OFFICE 2,466,319

PLANETARY TRANSMISSION UNIT

Frank L. Lawrence, Renton, Wash., assignor to Pacific Car and Foundry Company, Renton, Wash.

Application November 30, 1944, Serial No. 565,823

20 Claims. (Cl. 74—760)

This invention relates to improvements in planetary transmission units.

One of the objects of this invention is to provide a transmission assembly for use in tractors, trucks, logging engines, and the like, in which a change from one speed to another may be made selectively without disconnecting any of the gears.

Another object of the present invention is to provide a dual planetary gear train coupled in tandem whereby a uniform step-up ratio of speeds may be secured without the shifting of any of the gear elements.

A further object of the invention is to provide a dual planetary gear train of tandem assembly in which a plurality of clutch members co-operate with the planetaries for providing the relative ratios essential to the change from one speed to another from the input to the output shaft.

More specifically, the invention comprehends a dual planetary arrangement in which clutches cooperate for locking elements of the planetary assemblies and in which the input and output shafts are arranged parallel whereby a compact and mechanically desirable assembly is provided. Other objects will more clearly hereinafter appear by reference to the accompanying drawings forming a part of this specification and wherein like characters of reference designate corresponding parts throughout the several views in which:

Figure 1 is a longitudinal sectional view of the assembly showing the parts used primarily in producing the first speed illustrated in heavy lines with the balance of the assembly in dotted lines.

Figure 2 is a similar view with the parts cooperating to provide the second speed illustrated in heavy lines.

Figure 3 is a similar view with the parts for producing third speed in heavy lines.

Figure 4 is a similar view with the parts for producing fourth speed in heavy lines.

Figure 5 is a similar view with the parts for producing fifth speed in heavy lines.

Figure 6 is a similar view with the parts for producing sixth speed in heavy lines.

Figure 7 is a similar view with the parts for producing seventh speed in heavy lines.

Figure 8 is a transverse sectional view taken on line A—A of Figure 7.

Figure 9 is a transverse sectional view taken on line B—B of Figure 7.

Figure 10 is a transverse sectional view taken on line C—C of Figure 7, and

Figure 11 is an enlarged sectional view of the fluid intake for the clutches.

First referring to Figure 7 there is illustrated in longitudinal section the entire gear and clutch assembly by means of which a plurality of seven speeds are provided, the assembly being such that the various selective speeds are available without disengaging any of the meshing gears. In Figure 7, which is illustrative of the seventh speed drive, it is essential that all of the parts be illustrated and therefore this figure is first described in order to initially set forth the details of the complete structure. The selective speeds in the illustrated embodiments are one to seven and will be described in their regular order, and this description will be directed to certain figures in the drawings which clearly set forth the parts essential for the particular speed in question.

In Figure 7 the source or input of power is indicated in part by the crank-shaft extremity 1, connected to the flywheel 2 by bolts 3 or other suitable means. A main housing includes clutch housing portion A and transmission housing B, illustrated as integral except for end plate C. The clutch housing is defined from the transmission housing by the intermediate partition D, this partition being located immediately rearward of the enlarged forward clutch housing and having superimposed openings E and F formed therein for arrangement of the front bearings of the main and counter shafts as will more clearly hereinafter appear. The rear closure plate C of the housing is bolted to the housing flange $b$ by bolts $c$ and is formed with rear bearing opening G for one end of the counter-shaft, and relatively large opening H, closed by plate $h$, the latter plate overlying opening H, for the passage of the pipes supplying the operating fluid as later described.

The clutch arranged in the clutch housing provides three separate clutching operations and the various parts of the clutches, including the friction plates, pressure plates and fluid operated pistons are internested to provide mutual relative support, quick and convenient assembly and disassembly and convenient operation through fluid pressure. The fluid pressure is supplied through a plurality of hollow pipes, all concentrically arranged and located within and concentric of the input shaft assembly. The clutches include the friction plates 4, 5 and 6 and pressure plates 7, 8 and 9, these parts being associated with the backing plates 10, 11 and 12, the first being formed as a part of the flywheel as shown. The backing plates 11' and 12, cylinders 14 and 15 and the flywheel 2 are assembled as a unit by means of studs 16 which extend through these parts as shown and are threaded into the flywheel at 17. In the structure illustrated the cylinders 14 and 15 and backing plates 11 and 12 are assembled as a unit thus providing a structure of the desired rigidity and exactness suitable to insure alined movement of the associated parts.

The pressure plates 7, 8 and 9 are bolted to the pistons 20, 21 and 22 respectively, by bolts 23 located at suitably spaced points about the overlapping portions of the structures and these pistons are actuated by fluid from a suitable source passing through the concentric feed pipes 24, 25 and 26 shown in Fig. 11. The inner pipe 24 providing the fluid passage for cylinder and piston 7—20, the pipe 25 supplying fluid pressure for cylinder and piston 8—21 and the pipe 26 supplying the innermost piston and cylinder assembly 9—22. A control valve J of any suitable type is used in controlling the multi-passageway, generally in accordance with the disclosure of my prior Patent No. 2,319,549, dated May 18, 1943. The friction plates 4, 5 and 6 are splined at their peripheral edges to the inner edge portions of the three spider structures 27, 28 and 29 respectively, the friction plates and cages being graduated in size to permit the nesting of the latter structures.

By this arrangement the three stage clutch can be selectively operated to deliver the input from the drive shaft to pre-selected gear combinations to deliver power in accordance with necessary requirements, this delivery of power being directly transmitted through the spiders or cages 27, 28 and 29 to the concentric hollow shafts 30, 31 and 32, which shafts extend rearwardly through the partition D of the housing.

The input assembly includes the design and arrangement of the concentric hollow shafts 30, 31 and 32. The exactness of the mounting and relationship of the anti-friction bearings for delivering the final load to the bearing area of the partition or wall D and bracket 38 is extremely important to insure relative rotation of the concentric shafts with friction at practically nil. In other words, contact between the concentric shafts 30, 31, 32 is eliminated except where they form bearing carriers for each other as will be obvious by an inspection of the drawings. It will be noted that the wall or partition D includes the grooved oil slinger d, flanged to provide an oil drain to communicate with an oil sump which cooperates with the outer surface of the annular shoulder 33 of the hub of the outer spider 27, this being reduced as at 34 to mount the inner raceway of the roller bearing assembly 35 interposed between this shoulder and the inner widened concentric wall opening E. Projecting rearwardly from the hub portion 34 is the hollow stub shaft 30 forming, as previously stated, an outer hollow shaft portion for mounting the spur gear 36 of the gear assembly. The free end of the hollow stub shaft 30 is mounted in the roller bearing 37 supported in the bracket 38 within the casing section B. Thus the shaft portion 30 functions primarily to carry the spur gear 36 and to directly receive the load on bearings 40 and 43 from the inner concentric shafts 31 and 32 carrying the inner spiders 28 and 29 respectively. The hub of spider 27 is recessed to provide a shoulder 39 to receive the bearing assembly 40 and oil seal 41, the bearing 40 supporting the hub of the intermediate hollow shaft 31, and the latter carrying the spider 28 to which the friction plate 5 is loosely splined. The intermediate shaft 31 extends entirely through the outer hollow stub shaft 30 at each end, the forward end merging into the spider 28 and the rearward end terminating forward of gear 46 and supporting the spur gear 42, the structure and function of which will more clearly hereinafter appear. The hub of shaft 31 which comprises that portion adjacent its connection to its spider 28, is formed with annular rearwardly extending recess 43, the inner wall of which forms a shoulder for the bearing assembly 44. The associated oil seal 41' completes the structure which forms a mounting for the hub 45 of the spider 29, the hub being properly recessed or channelled to receive these parts as their mounting. The hub 45 of the spider 29 is splined on the inner hollow shaft 32, adjacent the forward extremity of the latter, the shaft 32 extending rearwardly through the intermediate shaft 31 and supporting at its free end the spur gear 46, the latter operating with spur gear 80 as hereafter described. This structure provides a plurality of concentric shafts with segregated bearing so formed and arranged as to assemble the attending loads at the load supporting mediums, namely the wall or partitions D, and bracket 38.

The spur gears 42 and 46, mounted on the rear end portions of concentric hollow shafts 31 and 32 respectively, are associated through the medium of the brakes 50 and 51, the structure of which is better shown in Figure 8. These brakes include the collar 53 supported by the bracket 54, the collar receiving at each end the hubs of the spur gears 42 and 46 which are provided with the usual brake as shown, or other means.

The output shaft 60 is supported in end bearings located in end cups or housings 61 and 62 supported in the walls D and C, these housings 61 and 62 also forming bearing supports for concentric tubular shafts 63 and 64. The housing 61 is of cup form and includes an annular flange 65 extending from its outer face near its forward end, the cup being inserted in the opening F formed in the wall or partition D and the flange acting as a stop and providing fastening means therefor, with the aid of suitable stud bolts 65' or the like. This arrangement makes possible convenient assembly and adjustment of the bearing and parts associated therewith. The bearing cup or support 62 is seated in the opening G of end plate C and includes flange 66 by means of which, and the bolts 66', the support 62 is secured in place. The cylindrical support 62 is formed with inner annular shoulder 67, providing a stop for the bearing assembly 68 which is the mounting for the output connection 69. A packing structure 70 seals this bearing arrangement the packing being of conventional design to eliminate seepage of oil from the gear housing B. With regard to the output shaft 60 it will be noted that the forward bearing 71 in the housing 61 is the final load supporting bearing and, as in the instance of the input shaft, this load is transmitted to the medial wall D of the housing.

The output shaft 60 cooperates and functions with the tubular shafts 63 and 64, arranged concentrically thereon and having end bearings 72 and 73 respectively, these bearings each being located adjacent the open ends of the cups or housings 61 and 62. Both of the concentric tubular shafts 63 and 64 are free to rotate on the output shaft 60 and each includes a ball bearing assembly 75 and 76 at their inner adjacent ends, which ends include the spur gears 77 and 78. At the outer ends of the tubular shafts 63 and 64 are the spur gears 79 and 80 the hubs of which abut against the inner race of the tubular shaft bearing 72 and 73. The spur gears 79 and 80 are splined or keyed to the hollow shafts 63 and 64 and these spur gears mesh with the spur gears 36 and 46 of the input shaft assembly. The spur gears 77 and 78 are units of planetary assemblies in which they form the sun gear elements which in turn are associated with the planet pinion assemblies 81 and 82. The ring gears 83 and 84 complete the gearing arrangement of these planetaries. It will be noted that the sun gears 77 and 78 are as previously stated formed integral with the hollow shaft 63 and 64 respectively. The planet pinion assembly 82 thus meshes with the sun gear 78 and the ring gear 84, the latter being connected by means of annular flange 85 to annular plate 86 which is carried by the spur gear 87. Thus spur gear 87 mounted on the bearings 88 and 89 normally meshes with the spur gear 42 on the input shaft 31. This spur gear 42 due to the overrunning brake arrangement 50—51—54 is locked by the overrunning brake against reverse movement and thus locks the assembly heretofore outlined, for obtaining planetary movement of the planet gears 82. The flange plate 86 and the spur gear 87 are mounted on the bearings 88 and 89, these bearings being mounted on the hollow shaft 64 and being locked against axial displacement by virtue of the hub 90 of the spur gear 80 and the shoulder 91 of the hollow shaft 64.

Thus we have two planetary assemblies, the first including the planet pinions 81, sun gear 77 and ring gear 83, and the second including the planet pinions 82, sun gear 78 and ring gear 84. The planet pinions 81 are carried in a cage 105, best shown in Fig. 10, this cage 105 being secured to the flange plate 107, the latter being keyed as at 107', or otherwise fixed to and movable with the shaft 60. The planetary including the planet pinions 82, sun gear 78 and ring gear 84 are associated with the cage 94, this cage being similar to cage 105 as shown in Fig. 8. The cage 94 including the plate structure is mounted on bearing 96 arranged on the output shaft 60. The bearing 96 is spaced from the bearing 76 of the sun gear 78 by means of the ring 97 as shown. The cage 94 and 92 is secured to the annular flange 93 and the latter is loosely splined to the flange or other projecting structure 108 of the ring gear 83 so that the ring gear 83 is controlled by the movement of the planet pinions carried in the cage 94. The projecting flange 85 of the ring gear 84 is splined to the annular flange 86 which is fixed to the spur gear 87, the latter meshing with spur gear 42 of the input shaft and thus being controlled by the overrunning brake 50 as this brake locks the spur gear 42 against reverse movement. Rotation of the sun gear 77, which is formed integral with the shaft 63, is controlled through the brake 109 on the spider 27, through the hollow stub shaft 30 and spur gears 36 and 79. The planetary pinions 81 and their carrying cage 105 are rotated with the shaft 60 through the annular flange 107, the latter as previously described being secured to the cage 105 shown here by bolts 106. The ring gear 83 of this same planetary is controlled through the rotating cage 92 and 94 and indirectly through the ring gear 84, connection 85, flange 86, spur gears 87 and 42 and overrunning brake 50. The sun gear 78 is controlled through the spur gear 80 which meshes with the spur gear 46 on the input shaft, the latter being locked against reverse movement by the overrunning brake 51, or other suitable means which might operate as a brake for this gear 46.

Having described the structural features of the development, the operation of the assembly to accomplish the different speeds will now be pointed out.

The first speed which in the present disclosure approximates a ratio of 4½ to 1 is best illustrated in Fig. 1 in which the working parts are shown in heavy hatching. In this Fig. 1 the shaft 1 being driven at engine speed, with clutch pressure plate 9 engaging the friction disc 6, transmits power to the spider or cage 29 and through this spider 29 to inner shaft 32. It might be well to note that this inner shaft 32 is formed with an axial bore in which the concentric pipes 24—25 and 26 for the passage of the operating fluid are arranged. Power from shaft 32 is carried through gear 46 mounted on the extremity thereof, and gear 80 carried by the hollow hub 90, which latter structure is splined to the hollow shaft 64. The sun gear 78 which is integral with shaft 64 turns the planet pinions 82 and as the ring gear 84 is held from rotation by the connection 86—87—42, and the spur gear being held from reverse rotation by overrunning brake 50, the planet pinions 82 must revolve with their cage around the sun gear 78 at a speed proportionate to the gear ratios involved. The planet cage 92—94 rotates on its bearing 96 with the planet pinions 82 and carries with it the ring gear 83 which drives the planet pinion 81. The sun gear 77 of this planetary assembly is held from rotating by brake band 109 on spider 27, the braking action being transmitted through shaft 30, gears 36 and 79 and shaft 63. The planet pinions 81 and their associated cage 105 (see Fig. 10) being secured to flange plate 107, fixed to shaft 60, imparts motion to this shaft, which rotary motion will depend upon the ratio of the gears 77 and 83.

In second speed (see Figure 2) the engine shaft 1 being driven and clutch pressure plate 7 engaging the friction plate 4 drives the spider 27 and shaft 30, on which shaft is splined the spur gear 36. The spur gear 36 meshes with and rotates the spur gear 79, the latter being fixed on hollow shaft 63 which is integral with sun gear 77. The sun gear 77 thus being driven and ring gear 83 being locked against rotation by the braking means in the form of overrunning brakes 50 and 51, the planet gears 81 revolve around sun gear 77 carrying cage 105. The cage 105 is fixed to output shaft 60 by the anchored flange plate 107 so that the output shaft 60 is driven at a ratio determined by the gears 77 and 83 with the ring gear 83 locked by the brake. This distinguishes from the first speed in which the sun gear 77 is locked.

The third speed (see Figure 3) as shown, is designed to obtain a ratio of 2¼ to 1. With clutch plate 8 engaging the friction plate 5 power is transmitted from the shaft 1 to the spider 28 and through this spider shaft 31 is driven rotating gears 42 and 87. As gear 87 is secured to the annular flange 86 and as this flange 86 is anchored to ring gear 84, the sun gear 78 being held, planet pinions 82 will rotate and revolve with their cage 94. The cage 94 being in driving engagement with ring gear 83 will rotate planet pinions 81 and their supporting cage 105 will revolve around the sun gear 77. The movement of the planet gears 81 and their cage will drive the shaft 60 through the medium of the fixed flange plate 107.

The approximate ratio for the fourth speed (see Figure 4) is 1.8 to 1. In obtaining this fourth speed, the clutch plates 7 and 9 engage the friction plates 4 and 6 respectively, driving spiders 27 and 29 and through these spiders the concentric shafts 30 and 32. The shafts 30 and 32 rotate the gears 46 and 80 and the gears 36 and 79. The gear 80 drives through shaft 64 and the sun gear 78. The spur gear 79 which is driven by the gear 36 and spider 27, drives through the shaft 63 and the sun gear 77. In this operation the ring gear 74 is held from rotation and the planet pinions 82 rotate and will revolve about the sun gear 78 carrying the planet cage 94 and rotating ring gear 83 which rotates planet pinions 81 and revolves them around sun gear 77. As sun gear 77 is also rotating forwardly at a different velocity, the planet pinions will carry the annular flange 107 and shaft 60 at a ratio in proportion to the relative gear structures.

A fifth speed (see Figure 5) as shown here, is provided to obtain a ratio of approximately 1.5 to 1. The mechanism is best understood by reference to Fig. 5 in which the friction plates 5 and 6 through the medium of the spiders 28 and 29 deliver power to the concentric shafts 31 and 32 to the gears 42 and 46. These gears 42 and 46 drive the spur gears 80 and 87. In obtaining the gear ratio for producing this fifth speed the ring gear 84 and the sun gear 76 are both driven at equal speeds and the ring gear 83 is revolving at engine speed with sun gear 77 locked, rotating planet gears 81 which revolve around sun gear 77 carrying cage 105 which is secured to flange 107, causing shaft 60 to rotate.

The sixth speed (see Figure 6) is stepped up slightly to a ratio approximately 1.29 to 1. To obtain the 6th speed the clutch pressure plates 7 and 8 engage the friction plates 4 and 5 to drive the spiders 27 and 29 and through these spiders the concentric shafts 30 and 31, which rotate the spur gears 36 and 42. The spur gear 79 meshing with 36 drives the shaft 63 and through this shaft the sun gear 77. The spur gear 87 meshing with 42 drives through the medium of the flange plate 86 the ring gear 84. The sun gear 78 is held fixed through the overrunning brake 51. The planet pinion 82 revolves around the sun gear 78 and carries with it the cage 94 together with the ring gear 83 through the connecting parts 92 and 93, so that both ring gear 83 and the sun gear 77 are revolving forwardly at different speeds carrying with them the cage 105 and the fixed flange 107 and through this latter connection the shaft 60.

In the seventh speed (see Figure 7) all of the gears on the input shaft, namely gears 36—42 and 46 are revolving as a unit, each receiving its power from the shaft 1 through the three clutches and their associated spiders 27—28 and 29. The gears 36, 42 and 46 on the input shaft obviously drive the gears 79, 87 and 80 on the output shaft, these gears on the output shaft rotating at the same speed as the gears of the input shaft resulting in a direct drive. It will be obvious to one skilled in the art that a variation in the gear ratios will inherently result in a variation of the various speeds accomplished by the mechanism.

In operating the mechanism the individual or combined friction plates of the clutch assembly are actuated to transmit power to the proper spur gears of the input shaft. The detailed operating mechanism for the clutches may be varied. However, in Fig. 11 I have shown the pipe extremities which supply the fluid to the various clutch cylinders as properly packed and capable of relative movement in accordance with the movement of the pistons. It will be noted that in the instant development the output shaft is parallel to the input shaft rather than coaxial as is conventional in many structures. This arrangement consolidates the structure simplifying the application of fluid control and enables a desirable load carrying assembly. The planet pinion cages are of the semi-floating type, these cages being loosely associated with the ring gears and carried on a bearing which rides on the driven shaft. The specific arrangement of the bearings for the cages and the cage structure may be modified as for instance by locating a second bearing at the end of the cage riding on the sun gear shaft. As an alternate, the cages may be full floating as the sun and ring gears fix its orbit.

The casing structure is designed so that the gearing may run in an oil bath. The overrunning brakes 50—51 obviously function to prevent the rotation of the spur gears 42 and 46 except in a single direction and thus these spur gears are capable of functioning as a braking medium for parts of the gear assembly in accordance with predetermined speed requirements.

I claim:

1. In a power transmitting unit, a driving element, a plurality of concentric input shafts, a plurality of clutches for selectively transmitting power from the driving element to the input shafts, a spur gear mounted on each of said input shafts, locking means for each of said gears to permit locking of their shafts against reverse rotation, an output shaft arranged parallel to the concentric input shafts and having sleeves mounted thereon, spur gears on said sleeves meshing with the spur gears of the input shafts, each of the spur gears of said output shaft being free to rotate independent of said shaft, and planetary gear trains mounted on said output shaft, one of the planetary trains directly driving the output shaft and the other parts of said planetary trains being selectively locked to provide gear ratios transmitting power from the driving element to the output shaft at predetermined ratios.

2. In a power transmitting unit, a driving element, a plurality of concentric input shafts, a plurality of clutches for selectively transmitting power from the driving element to the input shafts, a series of spur gears, each of said spur gears being mounted on a different input shaft, an overrunning brake on each of said input shafts to permit rotation of said shafts and gears in one direction only, an output shaft arranged parallel to the concentric input shafts, sleeves on said output shaft, each sleeve having spur gears mounted thereon meshing with a spur gear of one of the input shafts, said sleeve being free to rotate independent of said output shaft, a pair of planetary assemblies on said sleeves, each planetary assembly including a sun gear rotatable with one of said sleeves, a planet unit and a ring gear, means for driving one element of one planetary assembly with one of the spur gears on an input shaft, means for driving another element of each of the planetary assemblies with a spur gear on another input shaft, and means for locking one of the planet units to rotate with said output shaft.

3. The substance of claim 2 characterized in that the means for locking certain of the spur gears on the sleeves on the output shaft is the means for locking the spur gears of the corresponding input shaft.

4. The substance of claim 2 characterized in that the locking of certain of the spur gears of the output shaft is automatically accomplished by selective operation of certain of said clutches.

5. In a power transmitting unit, a driving element, a plurality of concentric input shafts, a plurality of clutches for selectively transmitting power from the driving element to the input shafts, said clutches being axially arranged with respect to said input shafts and said input shafts being connected to said clutches by nested spiders, a spur gear mounted on each of said concentric input shafts, each of said spur gears being movable with their shaft in only one direction, an output shaft arranged parallel to the input shaft, sleeves mounted on the output shaft, spur gears on said sleeves meshing with the spur gears on the input shafts, the spur gears on said sleeves being free to rotate independent of said output shaft, a pair of planetary assemblies having sun gears mounted on said sleeves, each planetary assembly including a sun gear, planet unit, and a ring gear, means locking the ring gear of one planetary assembly to the planet unit of the other planetary assembly for rotation therewith, means locking the ring gear of the other planetary assembly to one of the spur gears for rotation therewith, and means selectively driving the sun gears of the planetary assemblies by certain of the spur gears of the input shafts.

6. In a power transmitting unit, a driving element, a plurality of concentric input shafts, a plurality of clutches for selectively transmitting power from the driving element to the several input shafts, a series of spur gears, each of said spur gears being mounted on a different input shaft and being driven in one direction thereby, an output shaft arranged parallel to the concentric input shafts, freely rotatable sleeves on said output shaft each having a spur gear at its outer end and rotatable therewith, each of the spur gears of said sleeves meshing with a spur gear of an input shaft, said sleeves on said output shaft being free to rotate independently of said shaft, a pair of adjacently arranged planetary gear trains mounted on the output shaft, each of the planetary gear trains including a sun gear fixed to one of said sleeves, a planet unit, and a ring gear, means for driving the ring gear of one of the planetary assemblies by means of a spur gear on one input shaft, means for driving a planet unit of one of the planetary assemblies by the ring gear of the adjacent planet assembly, means for driving the output shaft with the planet unit of one of said assemblies, and means for selectively locking the spur gears of the input shafts against movement in one direction to preselect a gear ratio from the driving element to the output shaft.

7. The substance of claim 6 characterized in that means are provided for rotating one of the ring gears of said planetary assemblies by one of said spur gears on one of said input shafts.

8. The substance of claim 6 characterized in that means are provided for locking one of the planet units with the ring gear of the adjacent unit.

9. The substance of claim 6 characterized in that means are provided for locking the sun gear of one of the planetary assemblies by braking the rotation of a clutch driven element.

10. In a power transmitting assembly, a first driving input shaft having a spur gear at one end thereof and driven therewith, a concentrically arranged second input shaft mounted on the first input shaft and having a spur gear driven thereby, a third input shaft concentrically arranged on the second input shaft and having a spur gear driven thereby, a main output shaft, a pair of concentrically arranged tubular shafts mounted on the main output shaft and each having a spur gear fixed for rotation therewith, said spur gears meshing with the spur gears of two of the input shafts, a spur gear freely mounted on one of the tubular shafts and meshing with a spur gear of the second input shaft, a second pair of spur gears mounted for rotation with said tubular shafts and arranged adjacent the inner ends of said shafts, a pair of planetary assemblies, each of the planetary assemblies including a sun gear, a planet unit and a ring gear, the sun gears of said planetary assemblies being the second pair of spur gears of said tubular shafts, means connecting the ring gear of one planetary assembly with the freely running spur gear of one of the tubular shafts, means connecting the ring gear of one planetary assembly with the planet unit of the other planet unit for rotation therewith, and means connecting one of the planet units with the main output shaft.

11. The substance of claim 10 characterized in that independently operated clutches connect a source of power with each of the input shafts.

12. The substance of claim 10 characterized in that a plurality of independently operated clutches connect a source of power with each of the input shafts, and one of the clutches is associated with a brake means for locking same against effective operation.

13. In a power transmitting unit, a source of power, a plurality of input shafts, separate nested clutch means for transmitting power to the individual input shafts, a spur gear carried by each input shaft, means for locking each input shaft against rotation in one direction, an output shaft, tubular stub shafts mounted on the output shaft, each stub shaft having a spur gear fixed thereto and meshing with a spur gear of the input shafts, a spur gear freely mounted for rotation on one of said stub shafts, a pair of abutting planetary assemblies on the output shaft, said planetary assemblies each including a sun gear, a planet unit, and a ring gear, the sun gear of each of the planetary assemblies being driven with one of said stub shafts, means for connecting the planet unit of one of the planetary assemblies with the output shaft, means for driving the ring gear of one planet assembly with said freely rotating spur gear of the output shaft, and means for driving the ring gear of the other planetary assembly by the planet unit of the other planetary assembly.

14. The substance of claim 13 characterized in that the braking of certain of the spur gears of the input shaft is in one direction by means of overrunning brakes.

15. The substance of claim 13 characterized in that the braking of one of the input shafts includes a braking action applied to one of the nested clutches.

16. A constantly meshing transmission assembly for connecting a driving and driven shafts, said assembly including a plurality of concentric input shafts each controlled by an independent clutch, each input shaft having a spur gear, certain of said spur gears being mounted on overrunning brakes, an output shaft, hollow shafts arranged at each end on said output shaft, spur gears at each end of each of said hollow shafts, the spur gears at the outer end of the hollow shafts each being normally in mesh with one spur gear of one of the input shafts, a spur gear freely mounted intermediate the ends of one of said hollow shafts, and planetary gearing on each of the hollow shafts, each planetary gearing including as its sun gear the inner spur gears on said hollow shafts, and including planet units, and ring gears, the planet unit of one planetary being the direct driving medium of the output shaft, means connecting the freely mounted spur gear to the ring gear of one planetary unit, and means connecting the planet unit of one planetary with the ring gear of the other planetary.

17. In a power transmitting unit, a driving element, a plurality of concentric input shafts, a plurality of clutches for selectively transmitting power from the driving element to the input shafts, a series of spur gears, each of said spur gears being mounted on a different input shaft and certain of said gears being mounted to permit locking of its shaft against reverse rotation, an output shaft arranged parallel to the concentric input shafts and mounting hollow shafts carrying spur gears meshing with the spur gears of the input shafts, one of the spur gears being mounted outwardly of the other spur gear, said hollow shafts being free to rotate independent of said output shaft, planetary assemblies each planetary assembly being carried by one of said hollow shafts, said planetary assemblies each including a sun gear, planet gears, and a ring gear, means for driving the sun gears of the planetary assemblies by the outer spur gears on the output shaft, means for driving the ring gears of one of the planetary assemblies by one of said spur gears on one of said input shafts, and means connecting one of the planet units to the output shaft whereby said shaft rotates with said planet unit.

18. In a power transmitting unit, a driving element, a plurality of concentric input shafts, a plurality of clutches for selectively transmitting power from the driving element to the input shafts, a series of spur gears, each of said spur gears being mounted on a different input shaft, means for locking each input shaft against reverse rotation, an output shaft arranged parallel to the concentric input shafts, sleeves on said output shaft, spur gears mounted on said sleeves and meshing with the spur gears of the input shafts, each of the spur gears of the output shaft being free to rotate with their sleeve mounting independent of said output shaft, planetary units mounted on said output shaft, said planetary units each including a sun gear mounted on one of said sleeves, a planet pinion assembly, and a ring gear, means for driving the sun gears of the planet assemblies through a spur gear on one of the input shafts, means for driving the ring gears of said planet assemblies by one of said spur gears mounted on an input shaft, and means for driving the output shaft through one of the planet unit assemblies.

19. In a power transmitting unit, a driving element, a plurality of concentric input shafts, a plurality of clutches for selecting transmitting power from the driving element to the input shafts, a series of spur gears, each of the spur gears being mounted on a different input shaft, an output shaft arranged parallel to the concentric input shaft, a pair of spaced sleeves mounted on the output shaft each having at its outer end a spur gear meshing with a spur gear of one of the input shafts, said sleeves being free to rotate on said output shaft, a pair of adjacently arranged planetary assemblies, said planetary assemblies each including a sun gear rotatable with a sleeve, a planet unit, and a ring gear, means for driving each of the sun gears of the planetary assemblies with one of the spur gears on one of the sleeves, means for driving a ring gear of one of the planetary assemblies with one of the spur gears on one of said sleeves, means for driving a ring gear of one planetary with the planet unit of the other planetary assembly, and means for driving the output shaft by one of the planet units.

20. In a power transmitting unit, a driving element, a plurality of concentric input shafts, a plurality of clutches for selectively transmitting power from the driving element to the input shafts, a series of spur gears, each of said spur gears being mounted on a different input shaft and certain of said gears being mounted to permit locking of their shaft against reverse rotation, an output shaft arranged parallel to the concentric input shafts, hollow shafts on the output shaft and rotatable independently thereof, spur gears at each end of each hollow shaft and each rotatable therewith, a freely rotatable gear on one of said hollow shafts, the outer spur gears on said hollow shafts meshing with the spur gears of the input shafts, a pair of planetary assemblies, each planetary assembly including a sun gear, a planet unit and a ring gear, the inner spur gear on said hollow shafts being the sun gears of said planetaries, means for driving one element of each planetary assembly with one of the spur gears on the input shafts, means for driving another element of each of the planetary assemblies with another element of the other planetary, and means for locking one of the planet units to said output shaft.

FRANK L. LAWRENCE.

REFERENCES CITED

The following references are of record in the file of this patent:

UNITED STATES PATENTS

| Number | Name | Date |
| --- | --- | --- |
| 1,256,371 | Rowledge | Feb. 12, 1918 |
| 1,643,055 | Butell | Sept. 20, 1927 |